United States Patent
Vogler et al.

(10) Patent No.: US 8,216,408 B2
(45) Date of Patent: Jul. 10, 2012

(54) SONOTRODE WITH U GAP

(75) Inventors: Ulrich Vogler, Uhldingen-Mühlhofen (DE); Hartmut Möglich, Ettlingen-Schluttenbach (DE); Thomas Wipfler, Ettlingen (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 0 days.

(21) Appl. No.: 12/747,930

(22) PCT Filed: Dec. 8, 2008

(86) PCT No.: PCT/EP2008/067030
§ 371 (c)(1),
(2), (4) Date: Jul. 28, 2010

(87) PCT Pub. No.: WO2009/077375
PCT Pub. Date: Jun. 25, 2009

(65) Prior Publication Data
US 2010/0282395 A1    Nov. 11, 2010

(30) Foreign Application Priority Data
Dec. 14, 2007  (DE) .......................... 10 2007 060 442

(51) Int. Cl.
*B32B 37/00* (2006.01)

(52) U.S. Cl. .................... 156/73.3; 156/73.1; 156/580.2
(58) Field of Classification Search .................... 156/64, 156/73.1, 358, 499, 580, 580.1, 580.2, 581, 156/583.1, 73.3
See application file for complete search history.

(56) References Cited

U.S. PATENT DOCUMENTS

| | | | |
|---|---|---|---|
| 5,620,555 A * | 4/1997 | Choudhury | 156/580.2 |
| 6,460,591 B1 * | 10/2002 | Gotoh et al. | 156/359 |
| 2004/0076790 A1 | 4/2004 | Wylie | |
| 2005/0104389 A1 * | 5/2005 | Vadot et al. | 293/117 |
| 2010/0154304 A1 | 6/2010 | Tsangaris | |

FOREIGN PATENT DOCUMENTS

| | | |
|---|---|---|
| GB | 998124 | 7/1965 |
| WO | WO 2009009891 A1 | 1/2009 |

* cited by examiner

Primary Examiner — James Sells
(74) Attorney, Agent, or Firm — Paul & Paul

(57) ABSTRACT

The invention concerns an ultrasonic sonotrode having a sealing surface which is intended to come into contact with the material to be processed. To provide an ultrasonic sonotrode, an ultrasonic sealing apparatus and a method of ultrasonic processing, which avoids complicated and expensive positioning of the sonotrode and which nonetheless ensures uniform good quality for the weld seam, it is proposed according to the invention that the sealing surface is of a two-part configuration and the two sealing surface parts are formed by two mutually facing sealing surface portions.

23 Claims, 10 Drawing Sheets

Figure 1:
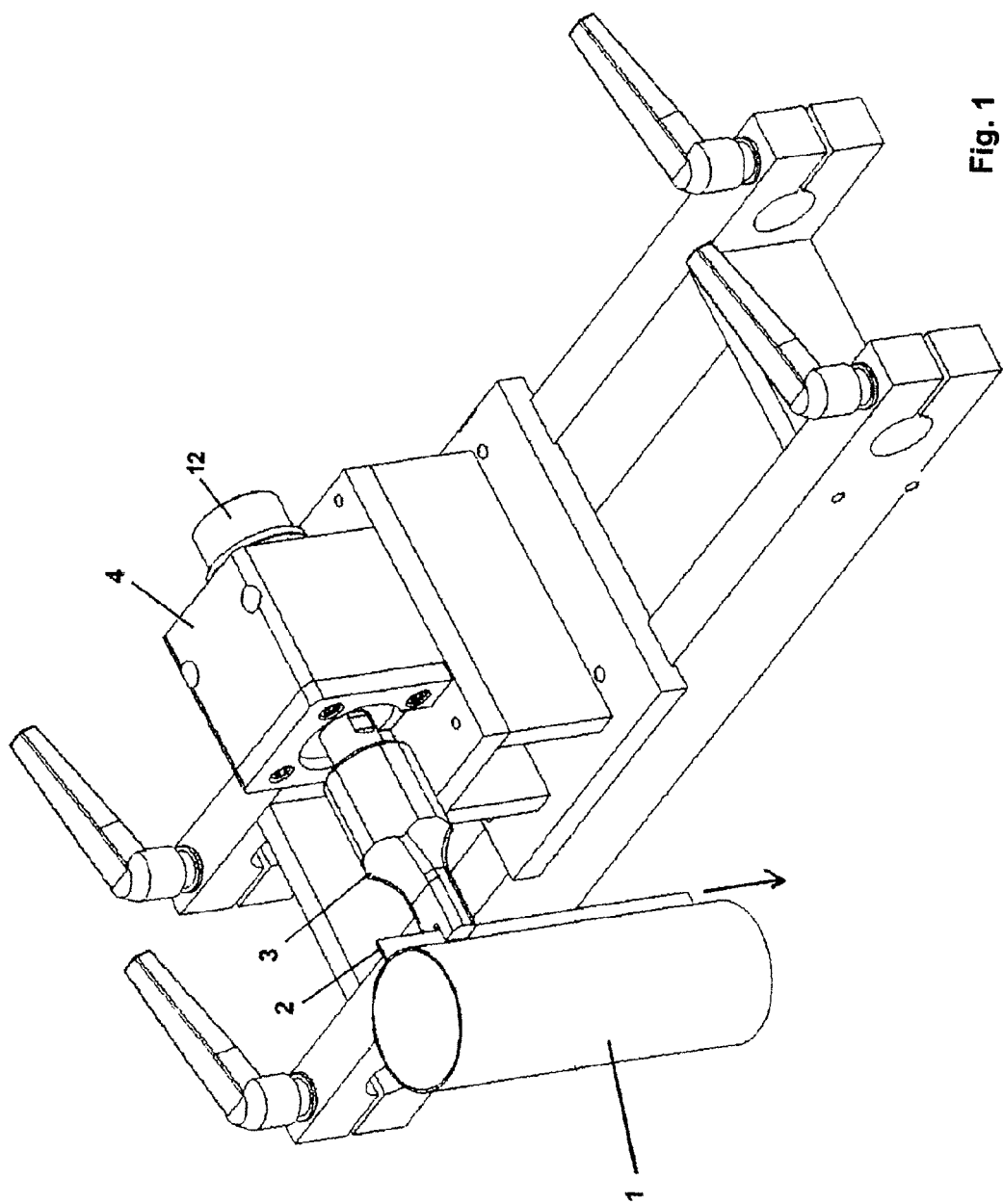

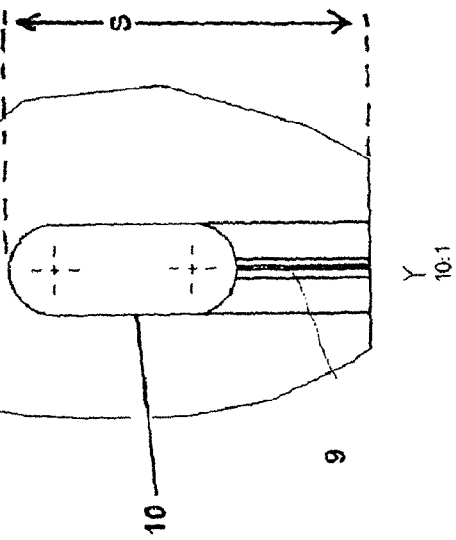
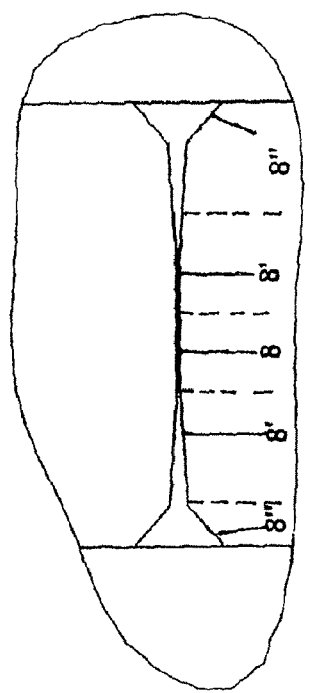
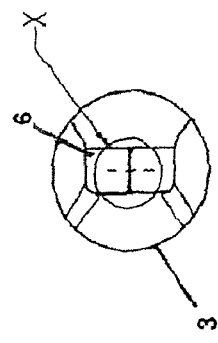
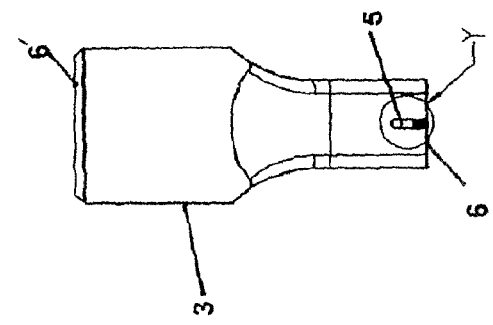
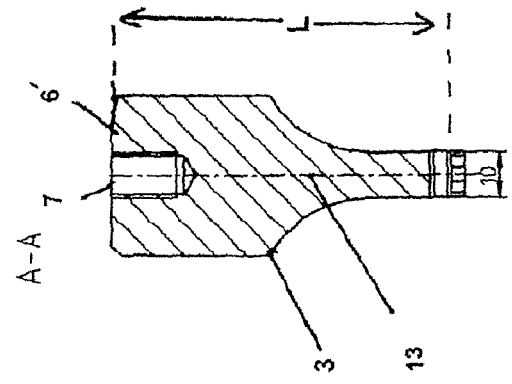

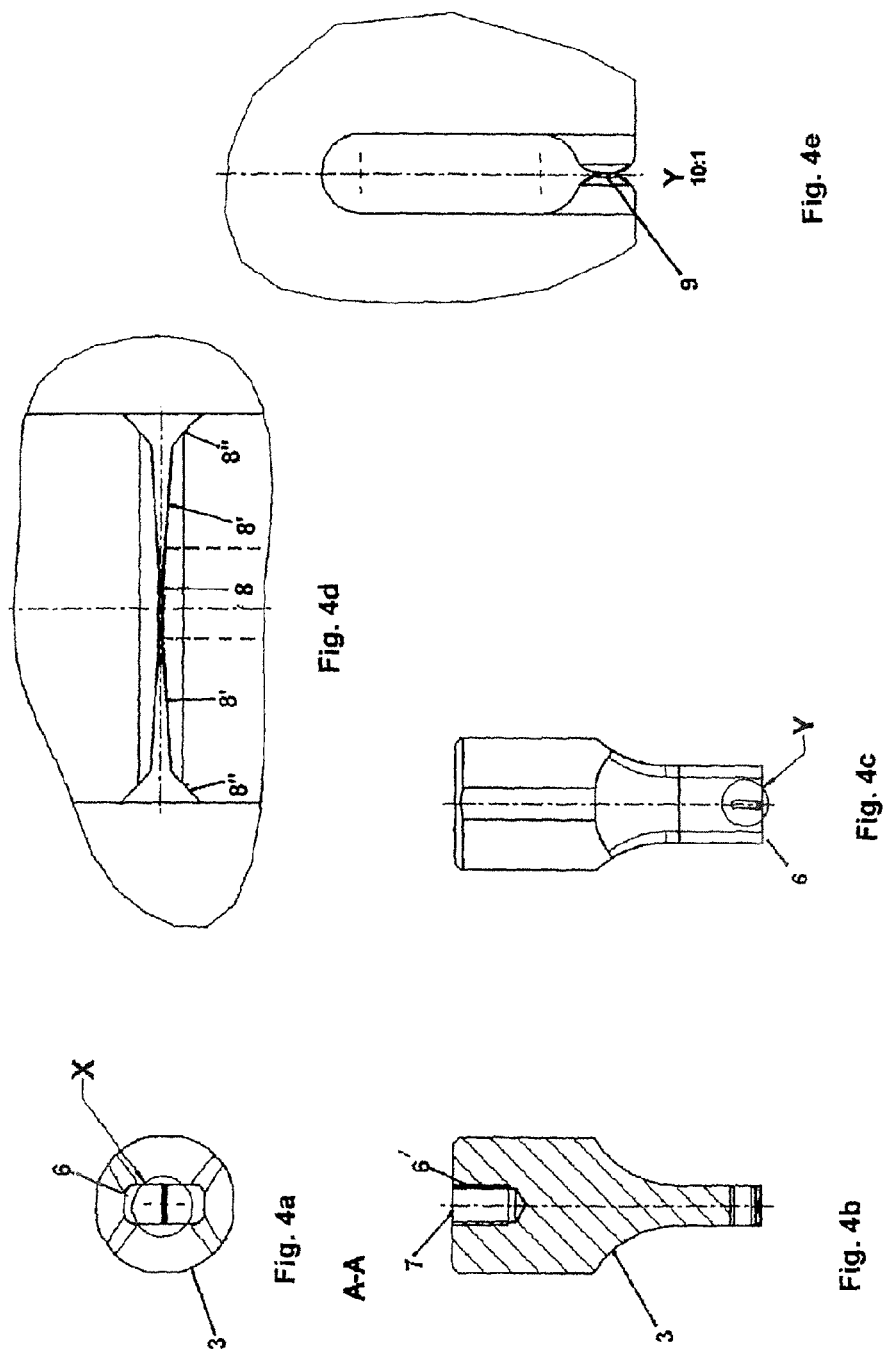

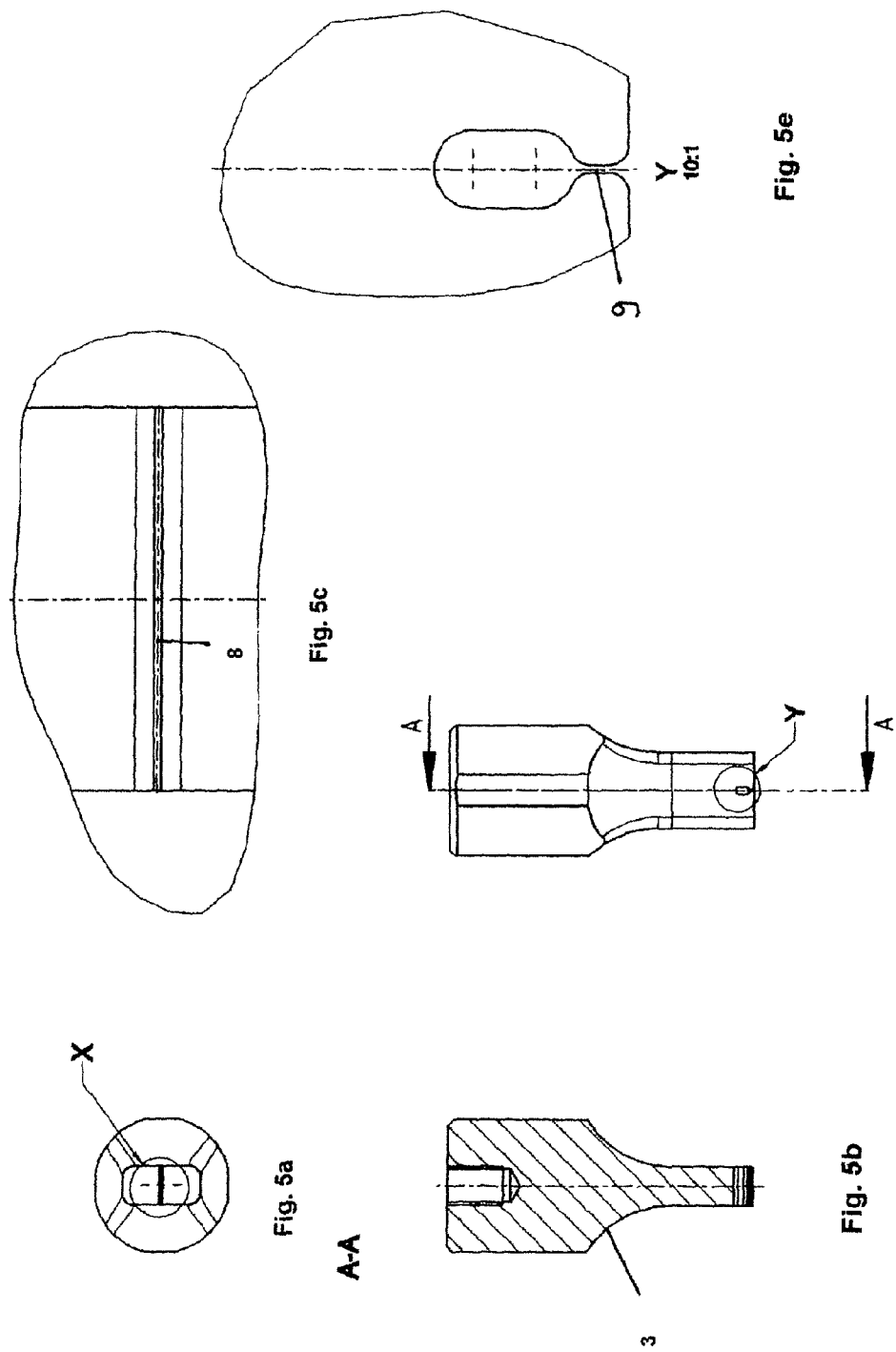

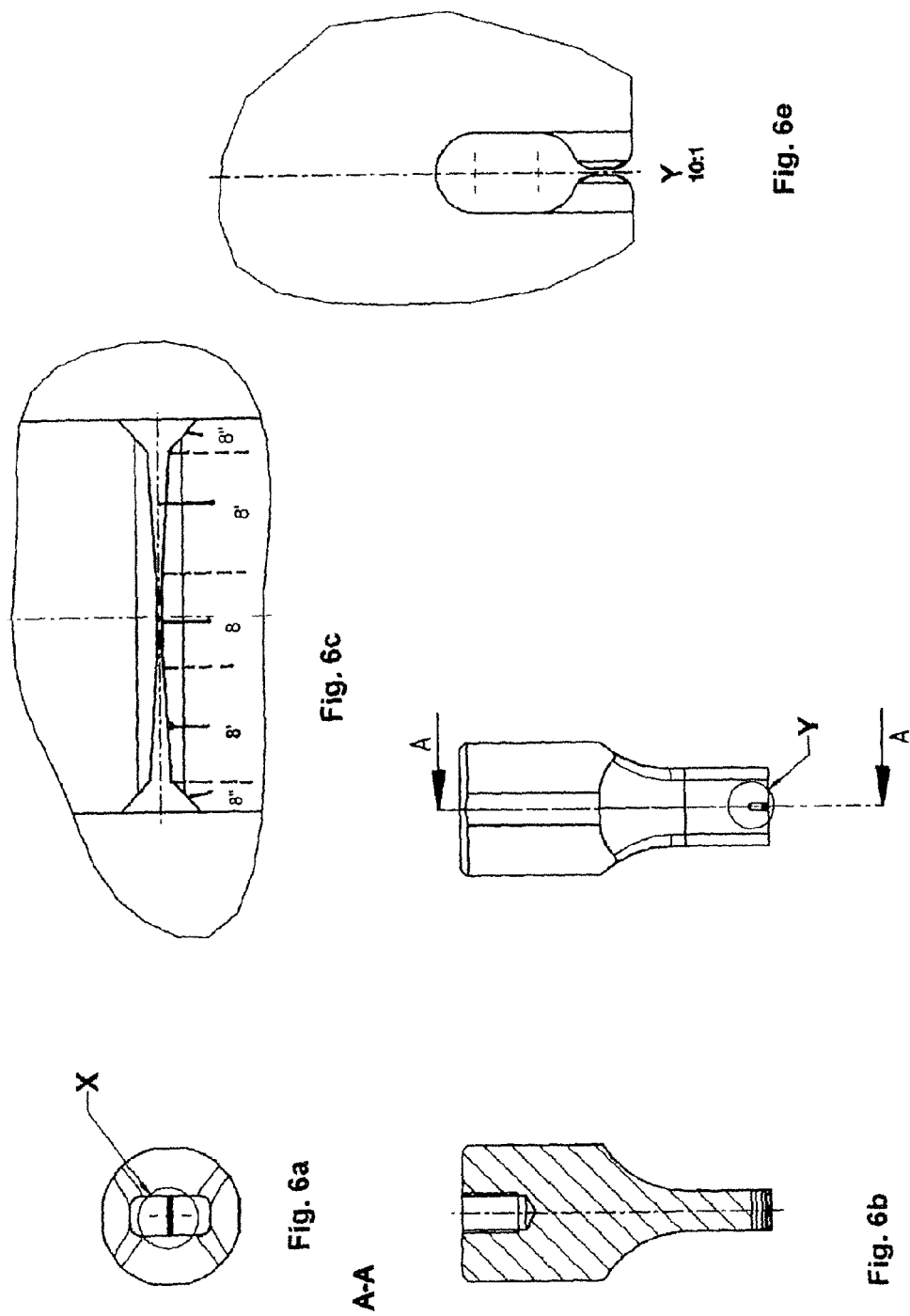

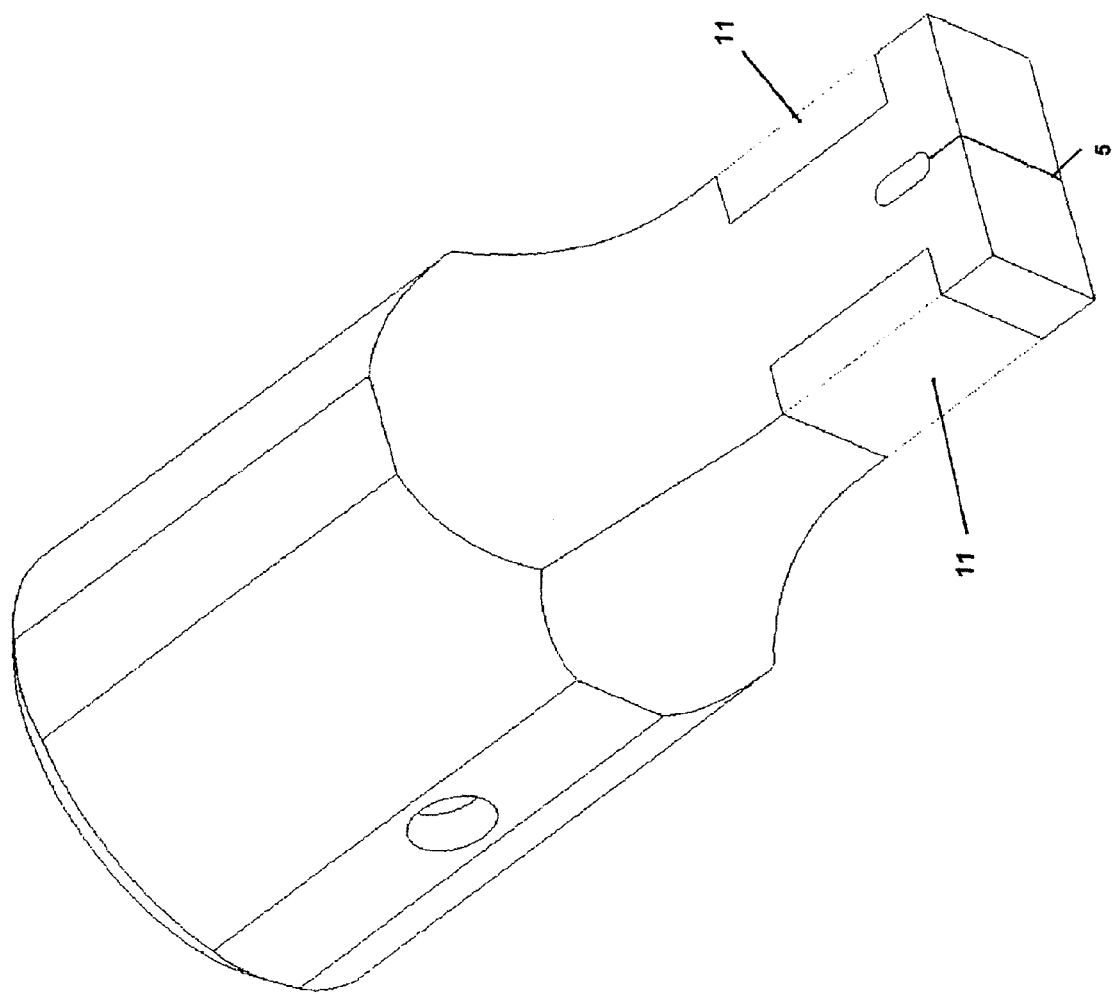

SONOTRODE WITH U GAP

The present invention concerns an ultrasonic sonotrode.

Ultrasonic sonotrodes are known from production engineering, for example in ultrasonic welding of plastic materials.

Ultrasound is a mechanical vibration above the audible limit. The frequency range begins at about 20 KHz and extends up to frequencies of 1 GHz. Such ultrasonic frequencies are frequently generated from electrical energy by means of piezoelectric sound transducers (converters). That mechanical vibration energy is applied to the workpiece or the material to be processed, by way of the sonotrode which is connected to the converter, possibly by way of an amplitude transformation portion (booster). The surface of the sonotrode, which is intended to come into contact with the material to be processed, is also referred to as the sealing surface.

The vibration structure thus consists of a generator, a converter, optionally the booster and the sonotrode. For many situations of use the converter and the sonotrode are of an integral configuration.

When processing materials by means of ultrasound, the material to be processed is generally positioned between the sonotrode and a counterpart or backing tool (which does not belong to the vibration structure) and which is also referred to as the anvil. The sonotrode which is in contract with the material to be processed then transmits the ultrasonic energy to the material to be processed which in that way is for example welded or severed.

Frequently so-called horizontal or vertical tubular bag packaging machines are used in the packaging field. In those machines, a web of material is drawn from the roll, shaped into a tube and the longitudinal edge is sealed. Thereafter the bag is filled, sealed in the transverse direction and finally cut off. Welding of the transverse seam therefore produces both the head seam of the filled bag and also the bottom seam of the next bag. Horizontal packaging machines feed the items to be packaged horizontally so that they are generally only suitable for piece goods. Vertical packaging machines feed the article in a substantially horizontal direction so that it is suitable for bulk goods.

The longitudinal and transverse seams can be sealed by means of ultrasound. In that case the heat required for plasticising the web of material is generated by the conversion of ultrasonic vibrations into frictional energy. Boundary layer and molecular friction means that heat is thus generated, which causes the plastic material to melt. In that case longitudinal ultrasonic vibration is used.

In the above-mentioned tubular bag packaging machines the film is wrapped in a tubular shape around the article so that the two film edges are brought together during the movement in the transport direction. The film edges which then overlap are continuously moved between the sonotrode on the one hand and the counterpart or backing tool on the other hand to seal the longitudinal seam.

In that respect it is essential that the gap between the sonotrode and the counterpart tool (anvil) remains substantially constant to ensure a uniform weld quality. As the vibration structure and in particular the sonotrode heats up during the working operation, thermal expansion of the materials involved results in a change in the gap dimension so that the position of the sonotrode should be re-adjusted in relation to the counterpart tool.

Such re-adjustment is very complicated and expensive. In addition the sonotrode-anvil pair in the present configuration takes up a very great deal of space, especially as the mechanism for movement of the sonotrode also has to be disposed there.

Taking the described state of the art as the basic starting point therefore the object of the present invention is to provide an ultrasonic sonotrode, an ultrasonic sealing apparatus and a method of ultrasonic processing, which avoids complicated and expensive positioning of the sonotrode and which nonetheless ensures uniform good quality for the weld seam.

In regard to the sonotrode that object is attained in that the sealing surface is of a two-part configuration and the two sealing surface parts are formed by two mutually facing sealing surface portions.

In other words, in contrast to the embodiments in the state of the art, the material to be processed is no longer processed between the sealing surface of the sonotrode on the one hand and a contact surface of the counterpart tool on the other hand, but by two mutually facing sealing surface portions of the sealing surface of the sonotrode. A counterpart tool is thus not required so that it is possible to dispense with the complicated and expensive positioning operation and regulation of the spacing between the sonotrode and the counterpart tool.

Thus it is possible for example for the sonotrode to be provided with a gap, wherein the two sealing surface parts are formed by portions of the mutually facing gap walls. Material processing is therefore effected within the gap. In principle the gap can be arranged at any desired location of the sonotrode.

Admittedly, sonotrodes are already known in the state of the art, which have a slot, but those slots are only provided to influence the vibration characteristics of the sonotrode. In no case is the material processed within the slot.

In that respect it is advantageous if the two sealing surface parts are in substantially mutually parallel relationship.

If the gap extends substantially over the entire surface, that has the advantage that the web of material to be processed can be more easily continuously moved through the gap.

If the gap or the gap width widens in the direction of the bottom of the gap, on the one hand mobility of the material to be processed is facilitated in the gap and on the other hand the vibration characteristic of the sonotrode is improved.

In a particularly preferred embodiment the gap, in the direction of the bottom of the gap, has a processing portion of a substantially constant first gap width and a relief portion of a substantially constant second gap width, wherein the second gap width is preferably at least twice as great and particularly preferably at least five times as great as the first gap width.

In a preferred embodiment the processing portion itself, in the direction of the bottom of the gap, can comprise a sealing portion and two holding portions which adjoin the sealing portion at both sides, wherein the gap is of a smaller gap width in the region of the sealing portion than in the region of the holding portions. It will be appreciated that the gap width is very much smaller in the region of the holding portions than in the region of the relief portion. Sealing or optionally cutting of the material is effected only in the region of the sealing portion. The holding portions provide for suitable guidance for the material.

In a particularly preferred embodiment the processing portion has two sealing portions and a holding portion arranged between the sealing portions, wherein the gap is of a smaller gap width in the region of the sealing portions than in the region of the holding portion. In other words, in the region of its processing portion, the gap has two gap constrictions, the so-called sealing portions. Those sealing portions provide for the production of a sealing seam. If therefore there is more than one sealing portion, ultrasonic processing leads to a plurality of parallel sealing seams, which is advantageous for many situations of use.

It has been found that the gap width can also be varied in the longitudinal direction. The gap width advantageously becomes greater in the direction of the gap ends. That makes it easier to thread the web of material into the gap.

In a particularly preferred embodiment the gap has in the longitudinal direction a central portion of a small gap width, two guide portions of medium gap width, adjoining oppositely disposed sides of the central portion, and two threading-in portions of large gap width, adjoining the guide portions.

In principle, in the embodiment according to the invention, it is also possible not to exclude a variation in the gap width by virtue of a variation in temperature of the sonotrode. It is also possible for a temperature gradient to be formed over the sonotrode, which changes the gap width.

Therefore a preferred embodiment provides a device for regulating the gap width of the processing portion. That device can have for example a heating element for generating a temperature gradient in the sonotrode. It is thus possible to influence the gap width by local heating of the sonotrode.

Alternatively or in combination therewith the sonotrode can have openings into which are fitted elements comprising a material having a coefficient of expansion which is different from the sonotrode material. The use of materials with different coefficients of expansion means that, upon a corresponding rise in temperature of the sonotrode, a (slight) stressing of the sonotrode and a change in gap width linked thereto occurs automatically, that is to say without requiring a particular active regulation procedure. With a suitable choice of material and place of installation therefore it is possible to counteract the change in the gap spacing by virtue of a temperature gradient which is produced within the sonotrode.

It will be appreciated that it is also possible to provide a plurality of sealing surfaces. Thus it is for example possible for the ultrasonic sonotrode to have a whole row of gaps which extend substantially parallel to each other and through which a respective web of material to be sealed is guided. In that way a multiplicity of webs of material can be simultaneously processed with a single sonotrode.

It is further possible for the sealing surfaces to have a coating to reduce the coefficient of friction between the sealing surface on the one hand and material to be processed on the other hand in order to counteract wear of the sealing surfaces.

In a preferred embodiment the converter is arranged at the end face of the sonotrode, that is in opposite relationship to the gap. In that way longitudinal vibrations are firstly produced by the converter within the sonotrode, that is to say vibrations which are parallel to the sealing surface. However, a longitudinal vibration also always causes transverse vibrations by virtue of periodic compression and stretching of the material. The gap is then so arranged that the gap is disposed substantially perpendicularly to the ultrasound propagation direction. The variation in gap width that is caused by ultrasound is then effected by the transverse vibrations. Tests have shown that the amplitude of the transverse vibration depends on the slot depth. In a preferred embodiment therefore the ratio of the gap depth to the sonotrode length is in the range of between 0.02 and 0.5, preferably in the range of between 0.03 and 0.35 and particularly preferably in the range of between 0.05 and 0.2.

Surprisingly the transverse vibration amplitude presents a maximum at the stated slot depths. With greater or smaller slot depths, the amplitude decreases. An optimum transverse vibration amplitude, for a 35 kHz sonotrode, is in the range of between 4 and 14 μm and preferably in the range of between 8 and 12 μm.

It has been found that the sealing surface parts vibrate in opposite-phase relationship with each other so that, when the sonotrode is acted upon with ultrasound, the slot width periodically varies so that this involves sealing processing of the material in the gap.

The sonotrode according to the invention thus manages entirely without a counterpart tool. The sonotrode itself thus integrally provides both the sonotrode and also the counterpart tool, in which case both surfaces which come into contact with the material are acted upon with vibrations so that division into a vibrating sonotrode and a stationary counterpart tool is no longer possible.

In principle the sonotrode can be produced from any desired material. Sonotrodes of titanium or a sintered material, for example steel, have proven to be particularly suitable.

In regard to the ultrasonic sealing apparatus the aforementioned object is attained by an ultrasonic sealing apparatus comprising a converter and a sonotrode of the specified kind, which is connected to the converter optionally by way of an amplitude transformer.

In that respect it has been found that the sonotrode in the ultrasonic sealing apparatus is preferably secured substantially rigidly to an element which does not form part of the vibration structure. The fixing of the vibration structure consisting of the converter, optionally the amplitude transformer and the sonotrode, therefore engages the sonotrode. The term an element which does not belong to the vibration structure is used to denote any element which is not acted upon with ultrasound and which therefore does not perform any vibration. It will be appreciated that it is possible for that element to be moved for adjustment purposes. That movement however is negligible in comparison with the fast ultrasonic vibrations so that it is possible to speak of a non-vibrating element.

In general the fact that the sonotrode is rigidly held substantially transversely relative to the sealing seam to be produced is more important than longitudinally relative to the sealing seam. In a preferred embodiment it is therefore provided that the sonotrode is fixed to the holder at a vibration node, wherein the holder is of such a design configuration that it is substantially rigid in the direction of the sonotrode axis, that is to say in the direction of sound propagation, while in a direction perpendicular to the sonotrode axis it provides a certain elastic resiliency in order to completely decouple the ultrasonic vibrations from the holder.

The present invention further concerns a method of ultrasonic processing of a material, in which the material to be processed comes into contact with the sonotrode set forth in the opening part of this specification. In that respect in a preferred embodiment the material is guided through the gap in the longitudinal direction in the processing operation. In principle it is possible in that way to weld or cut the material.

In a particularly preferred embodiment the width of the sonotrode gap is so selected that it is smaller than the thickness of the material to be processed. Preferably the gap width is between 10 and 50% and particularly preferably between 20 and 40% and at best is about 30% smaller than the thickness of the material to be processed. If for example two films are welded together, the thickness of the material to be processed is equal to double the film thickness.

Therefore the material to be processed is introduced into the gap while the sonotrode is excited with ultrasound. Excitation of the sonotrode with ultrasound results in a periodic variation in the gap width so that the material can be introduced into the gap. In the condition of not being excited with ultrasound, the material cannot be moved in the gap. It is only after the sonotrode is acted upon with ultrasound that the material can be moved in the longitudinal direction of the gap so that ultrasonic processing then takes place.

In a preferred embodiment the sonotrode is in the form of a round sonotrode. The term round sonotrode is used to denote sonotrodes of a basic shape which is circular in cross-section. A particularly preferred sonotrode is one which is in the form of a round sonotrode at its end towards the converter and is in the form of a block sonotrode (rectangular cross-section) at its end remote from the converter.

An alternative embodiment provides that at least one and preferably both sealing surface parts are arranged on plates connected to the sonotrode. At least one plate can be equipped with an adjusting device for setting the gap width. That embodiment has the advantage that, upon wear of the sealing surfaces, it is not the entire sonotrode but only the plate or plates that is or are to be replaced.

Figure 2:
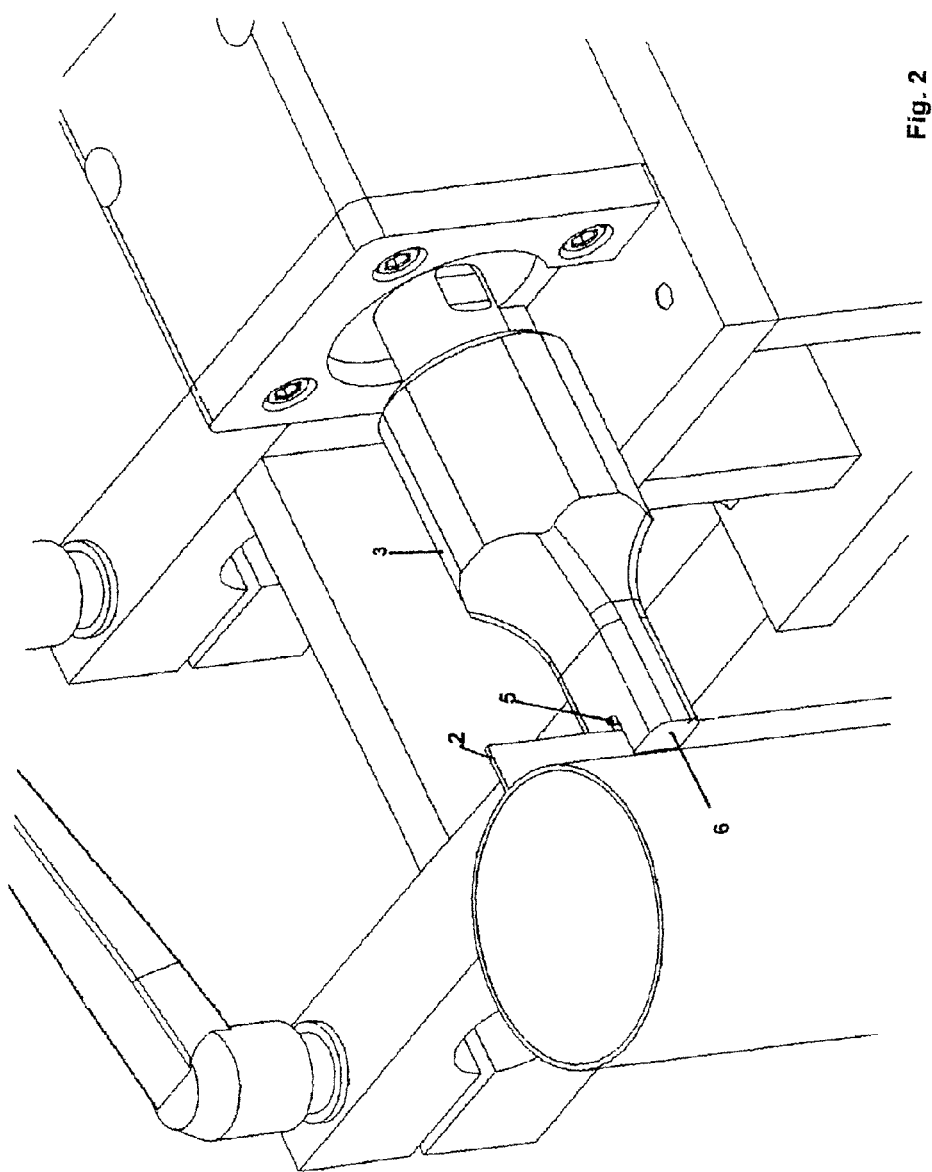
Figure 7E:
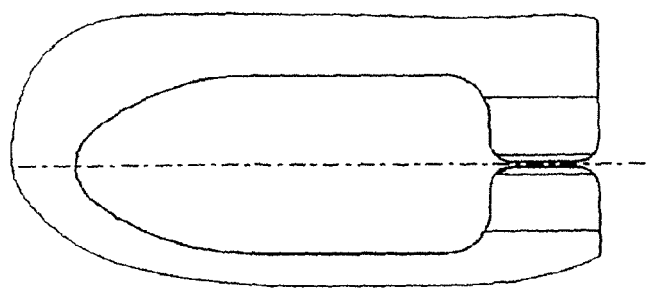
Figure 7C:
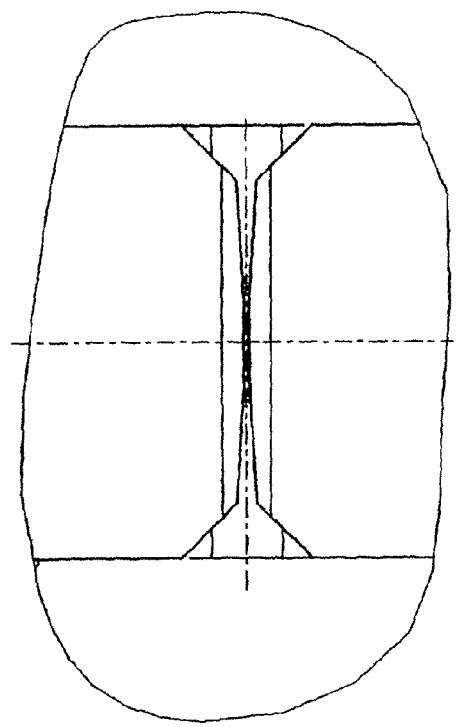
Figure 7D:
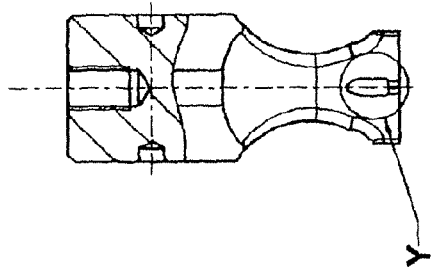
Figure 7A:
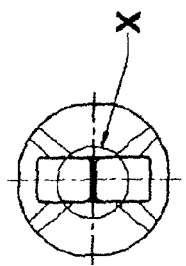
Figure 7B:
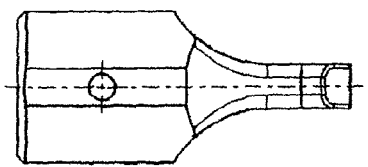
Figure 8E:
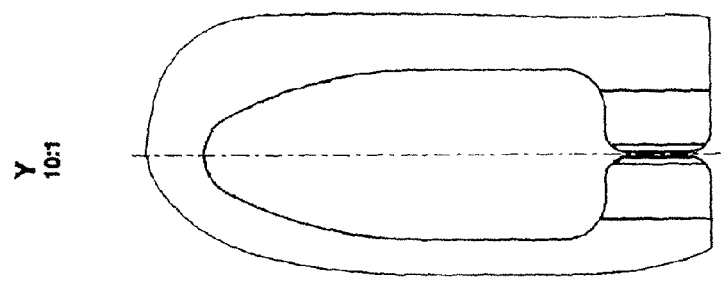
Figure 8C:
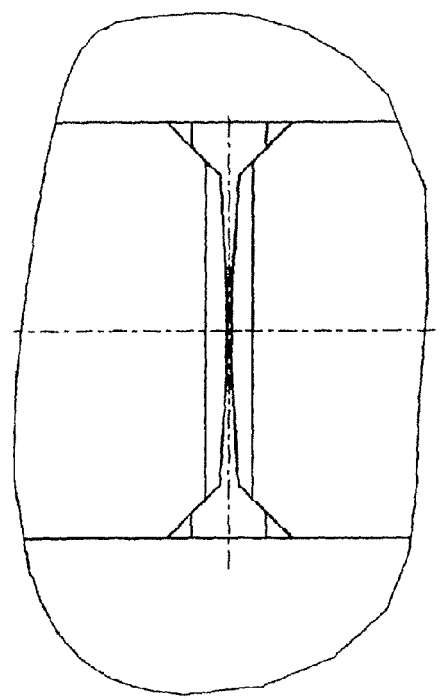
Figure 8D:
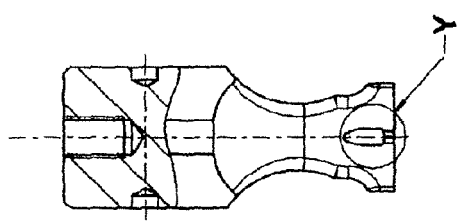
Figure 8A:
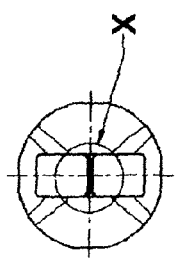
Figure 8B:
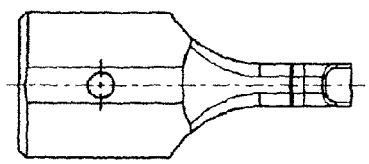
Figure 9A:
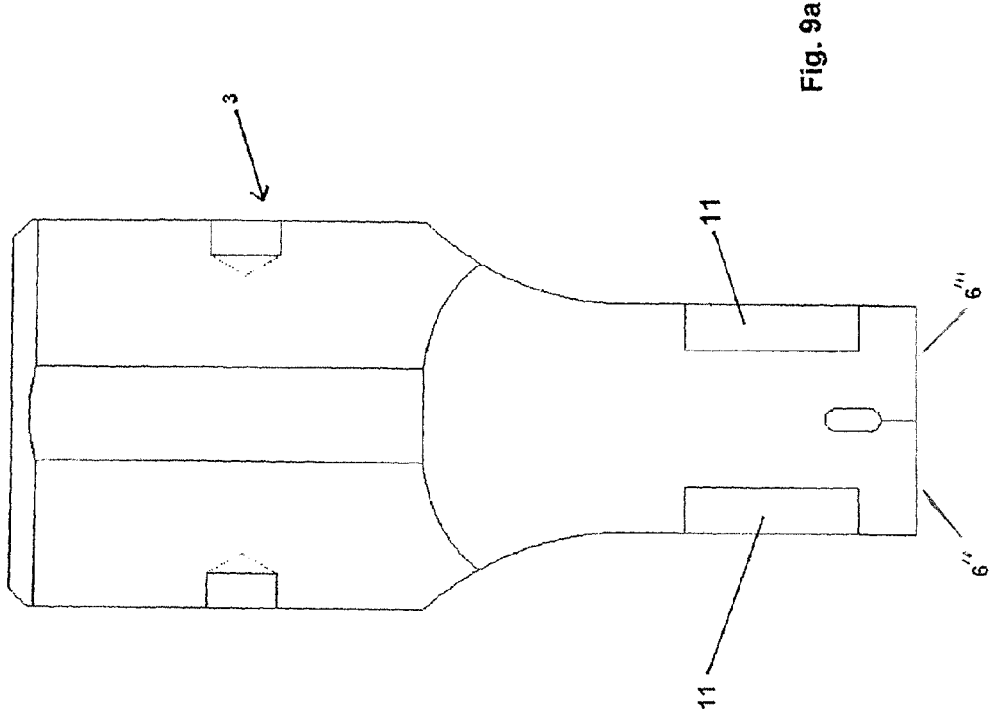

Further advantages, features and possible uses of the present invention will be apparent from the description hereinafter of some preferred embodiments and the accompanying Figures in which:

FIG. 1 shows a vertical tubular bag packaging machine with a sonotrode according to the invention, FIG. 2 shows an enlarged-scale detail from FIG. 1, FIGS. 3a-3e show various views of a first embodiment of a sonotrode according to the invention, FIGS. 4a-4e show various views of a second embodiment of a sonotrode according to the invention, FIGS. 5a-5e show various views of a third embodiment of a sonotrode according to the invention, FIGS. 6a-6e show a fourth embodiment of a sonotrode according to the invention, FIGS. 7a-7e show a fifth embodiment of a sonotrode according to the invention, FIGS. 8a-8e show a sixth embodiment of a sonotrode according to the invention, and FIGS. 9a and 9b show two views of a sixth embodiment of the sonotrode according to the invention.

FIG. 1 shows a vertical tubular bag packaging machine. It will be seen that the web of material 1 to be processed is shaped around a tube so that the two web edges overlap. The overlap region is denoted by reference 2. The material webs which bear against each other are guided through a gap in the sonotrode 3 which in turn is connected to a converter 4 and a generator 12. The generator 12 generates high-frequency electrical voltage which is converted by the converter 4 into mechanical vibration energy which is fed by way of the sonotrode 3 to the web of material 1. Processing is effected continuously, that is to say the web of material 1 is moved continuously in the direction of the arrow so that the overlapping web of material is welded together beneath the sonotrode 3 in FIG. 1. It will be appreciated that a cyclic movement is also possible, in which the advance movement of the web of material is interrupted regularly—for example to apply a transverse sealing seam.

FIG. 2 shows an enlarged-scale detail from FIG. 1. It will be seen that at its end face 6 the sonotrode 3 has a gap 5 which extends over the entire end face 6 and in which the overlap region 2 of the edges of the web of material is disposed. Although the converter 4 initially only transmits a longitudinal vibration to the sonotrode 3, that is to say a vibration in the direction of the longitudinal axis of the sonotrode, the gap 5 provides that the two end face portions 6", 6'" vibrate in opposite-phase relationship with each other so that the slot width periodically varies by virtue of the transverse vibrations. In that way the overlapping edge regions are welded together and the longitudinal seam is thus formed.

FIGS. 3a through 3e show a first embodiment of a sonotrode according to the invention. FIG. 3a shows a plan view on to the end face 6 of the sonotrode 3. FIG. 3b shows a sectional view. Here the sonotrode axis is shown in the form of a dash-dotted line 13. The sonotrode 3 has a fixing bore 7 at its opposite end face 6' remote from the gap 5. The bore 7 serves to fix the sonotrode to the converter or possibly to an amplitude transformer. It will be seen that the width of the sonotrode decreases from the converter end to the gap end. FIG. 3c shows a side view of the sonotrode, in which the gap 5 in the end face 6 can be clearly seen.

FIG. 3d shows an enlarged-scale detail from FIG. 3a. It will be seen that, in the longitudinal direction (transversely relative to the sonotrode axis), the gap 5 FIG. 3d comprises a central portion 8 of a small gap width, two guide portions 8' of medium gap width, that adjoin oppositely disposed ends of the central portion 8, and two threading-in portions 8" of large gap width, that in turn adjoin the guide portions. In that case the gap width of the central portion 8 is substantially constant over the entire portion while the gap width of the guide portions 8' enlarges in the direction of the outward ends of the gap. In the region of the threading-in portions 8", there is an abrupt increase in the width of the gap. During the processing operation the material to be processed is moved in the longitudinal direction of the gap, that is to say from left to right or from right to left in FIG. 3d, through the gap. The direction of movement of the material is thus transverse with respect to the sonotrode axis 13. The threading-in portions 8" enable the web of material to be easily introduced into the gap 5. The guide portions 8' provide that the material to be processed bears smoothly against the surface of the gap while the central portion 8 provides for processing of the web of material. In a preferred embodiment the gap width, i.e., the space between the gap interior faces, in the region of the central portion 8 is less than the thickness of the material so that the web of material can be introduced into the gap only when the sonotrode is excited with ultrasound.

FIG. 3e shows a portion on an enlarged scale from FIG. 3c. It will be seen that the gap 5 is of a depth S. In the direction of the bottom of the gap, that is to say the inward end in the direction of the sonotrode axis 13, the gap thickness also varies here. In the direction of the bottom of the gap the gap comprises a processing portion 9 and a relief portion 10. The width of the gap in the relief portion 10 is substantially greater than the width of the gap in the processing portion 9. The relief portion 10 only serves to decouple the two sonotrode end face 6 portions separated by the gap 5, from each other, to produce an optimum transverse vibration. The transverse vibration of the sonotrode 3 is at the greatest when the ratio of the gap depth S to the sonotrode length L is in the range of between 0.05 and 0.2.

FIGS. 4a through 4e show various views of a second embodiment of the invention. The same references have been used to denote the same components. It will be seen in particular from FIG. 4d that in this embodiment the central portion is smaller. It will be seen from FIG. 4e that the processing portion 9 is also markedly reduced in comparison to the relief portion 10 in comparison with the embodiment shown in FIGS. 3a through 3e.

FIGS. 5a through 5e show a third embodiment of a sonotrode 3 according to the invention. In this case also, as far as possible, the same reference numerals have been used to denote the same components. It will be seen from FIG. 5c that the slot width 8 remains constant in the transverse direction, unlike the preceding embodiments. FIG. 5d shows the slot portion of the gap 5, from an end face 6 view of the sonotrode 3, in a transverse orientation to the top view orientation shown in FIG. 5e.

FIGS. 6a through 6e show a fourth embodiment of the sonotrode according to the invention. This embodiment is similar to that shown in FIGS. 4a through 4e, but here the gap depth is markedly reduced.

FIGS. 7a through 7e show a fifth embodiment of the sonotrode 3 according to the invention. It will be seen from FIG. 7d that here the sonotrode 3 enlarges again in the direction of the end face 6, unlike the preceding embodiments. That shape is advantageous in order to optimise the transverse vibration amplitude.

FIGS. 8a and 8b, and 9a and 9b, diagrammatically show a further embodiment of the sonotrode 3 according to the invention. It can be clearly seen here that two compensating elements 11 have been introduced into the sonotrode 3 in the region of the end 6 thereof. Those compensating elements 11 are made from a material which differs from the material of the sonotrode 3 in that it is of a different coefficient of expansion. In particular the perspective view in FIG. 8b clearly shows that a temperature gradient which is produced within the sonotrode 3 by virtue of the heat will quite evidently have effects on the width of the gap 3 in the region of the processing portion. To compensate for that variation the compensating elements 11 are so adapted that they counteract the change in gap width.

The present invention provides a sonotrode and a method with which in particular vertical tubular bag packaging machines can be markedly simplified. An especially arranged counterpart tool in relation to which the sonotrode has to be set and possibly re-adjusted is no longer required. The amount of space required for the sealing device is markedly reduced.

LIST OF REFERENCES 1 web of material
2 overlapping region
3 sonotrode
4 converter
5 gap
6 end face
6' opposite end face
6" end face portion
6'" end face portion
7 fixing bore
8 central portion
8' guide portions
8" threading-in portions
9 processing portion
10 relief portion
11 compensating elements
12 generator
13 sonotrode axis

The invention claimed is:

1. An ultrasonic sonotrode having a longitudinal axis and having a sonically active sealing surface which is intended to come into contact with the material to be processed, characterised in that the sealing surface is of a two-part configuration so that the two sealing surface parts are formed by two mutually facing sealing surface portions of the sonically active sonotrode, characterised in that the sonotrode is elongate having opposite end faces further characterized in that an end face of the sonotrode has the gap extending there into in the direction of the sonotrode longitudinal axis said gap having a bottom, and wherein the two sealing surface portions are formed by portions of two mutually facing walls of the gap, and characterised in that the gap width is enlarged in the direction of the bottom of the gap.

2. A sonotrode as set forth in claim 1 characterised in that the two sealing surface portions are of a substantially mutually parallel configuration, wherein the gap width is varied by transverse vibrations.

3. A sonotrode as set forth in claim 1 characterised in that the gap extends substantially over the entire end face and has gap ends at opposing edges of the end face.

4. A sonotrode as set forth in claim 1 characterised in that in the direction of the bottom of the gap has a processing portion of a first gap width and a relief portion of a second gap width, wherein the second gap width is preferably at least twice as great and particularly preferably at least five times as great as the first gap width.

5. A sonotrode as set forth in claim 4 characterised in that in the direction of the bottom of the gap the processing portion comprises a sealing portion and two holding portions adjoining the sealing portion at both sides, wherein the gap is of a smaller gap width in the region of the sealing portion than in the region of the holding portions.

6. A sonotrode as set forth in claim 4 characterised in that the processing portion has two sealing portions and a holding portion arranged between the sealing portions, wherein the gap is of a smaller gap width in the region of the sealing portions than in the region of the holding portion.

7. A sonotrode as set forth in claim 3 characterised in that the gap width is enlarged in the direction of the gap ends.

8. A sonotrode as set forth in claim 7 characterised in that the gap extends in a longitudinal direction wherein the gap has a central portion (8) of a small gap width, two guide portions (8') of medium gap width, that adjoin oppositely disposed sides of the central portion (8), and two threading-in portions (8") of large gap width, that adjoin the guide portions.

9. A sonotrode as set forth in claim 1 characterised in that the sonotrode has a device for regulating the gap width of the processing portion.

10. A sonotrode as set forth in claim 9 characterised in that the regulating device has a heating element for producing a temperature gradient in the sonotrode.

11. A sonotrode as set forth in claim 9 characterised in that the sonotrode is made from at least two materials involving different coefficients of expansion.

12. A sonotrode as set forth in one of claim 1 characterised in that the sealing surface portions provide a plurality of sealing surfaces.

13. A sonotrode as set forth in claim 12 characterised in that the sealing surfaces have a coating.

14. A sonotrode as set forth in claim 1 characterised in that there is provided at least one sealing element which is removably fixed to the sonotrode and carries a sealing surface portion, wherein preferably the at least one sealing element is displaceable to adjust the spacing between the two sealing surface portions.

15. A sonotrode as set forth in claim 1 characterised in that the ratio of gap depth and sonotrode length is in the range of between 0.02 and 0.5, preferably in the range of between 0.03 and 0.35 and particularly preferably in the range of between 0.05 and 0.2.

16. An ultrasonic sealing apparatus comprising a converter and a sonotrode as set forth in claim 1, that is connected to the converter optionally by way of an amplitude transformer.

17. An ultrasonic sealing apparatus as set forth in claim 16 characterised in that the sonotrode is substantially rigidly fixed to a non-vibrating element.

18. A method of ultrasonic processing of a material with a sonotrode as set forth in claim 1, in which the material to be processed comes into contact with the two mutually facing sealing surface portions, which are formed from the inner surfaces of a gap in the longitudinal direction of the sonotrode, so that during the processing operation the material is guided through the gap in the longitudinal direction.

19. A method as set forth in claim 18 characterised in that the gap extends in a longitudinal direction and that in the processing operation the material is guided through the gap in the longitudinal direction thereof.

20. A method as set forth in claim 18 characterised in that the material is welded or cut.

21. A method as set forth in claim 18 characterised in that preferably the gap width is between 10 and 50% and particularly preferably between 20 and 40% and at best about 30% smaller than the thickness of the material to be processed.

22. A method as set forth in claim 21 characterised in that the material to be processed is introduced into the gap while the sonotrode is excited with ultrasound.

23. An ultrasonic sonotrode of claim 1, having a sealing surface which is intended to come into contact with the material to be processed, characterised in that the two sealing surface parts formed by two mutually facing sealing surface portions, each extending into the sonotrode, the sealing surface sealing portions being separated by a gap which has a width which is smaller than the thickness of the material to be processed.

* * * * *

UNITED STATES PATENT AND TRADEMARK OFFICE
CERTIFICATE OF CORRECTION

PATENT NO. : 8,216,408 B2  
APPLICATION NO. : 12/747930  
DATED : July 10, 2012  
INVENTOR(S) : Ulrich Vogler, Hartmut Moglich and Thomas Wipfler Page 1 of 1

It is certified that error appears in the above-identified patent and that said Letters Patent is hereby corrected as shown below:

IN THE SPECIFICATIONS:

Column 4, lines 30, reads -- an element which does not belong to the vibration structure is --
should read -- "an element which does not belong to the vibration structure" is --

Column 5, line 6, reads -- a round sonotrode. The term round sonotrode is used to --
should read -- a round sonotrode. The term "round sonotrode" is used to --

IN THE CLAIMS:

Column 8, line 46, in claim 12, reads -- 12. A sonotrode as set forth in one of claim 1 characterised --
should read -- 12. A sonotrode as set forth in claim 1 characterised --

Signed and Sealed this
Twenty-eighth Day of August, 2012

David J. Kappos
*Director of the United States Patent and Trademark Office*